(12) United States Patent
Carbone et al.

(10) Patent No.: US 9,250,942 B2
(45) Date of Patent: Feb. 2, 2016

(54) HARDWARE EMULATION USING ON-THE-FLY VIRTUALIZATION

(75) Inventors: Martim Carbone, Atlanta, GA (US);
Bernhard Jansen, Rueschlikon (CH);
HariGovind V. Ramasamy, Tarrytown, NY (US); Matthias Schunter, Zurich (CH); Axel Tanner, Kilchberg (CH); Diego M. Zamboni, Adliswil (CH)

(73) Assignee: International Business Machines Corporation, Armonk, NY (US)

(*) Notice: Subject to any disclaimer, the term of this patent is extended or adjusted under 35 U.S.C. 154(b) by 2027 days.

(21) Appl. No.: 12/022,184

(22) Filed: Jan. 30, 2008

(65) Prior Publication Data
US 2009/0192780 A1 Jul. 30, 2009

(51) Int. Cl.
G06F 9/455 (2006.01)
G06F 11/07 (2006.01)

(52) U.S. Cl.
CPC ........ *G06F 9/45537* (2013.01); *G06F 11/0712* (2013.01); *G06F 11/0793* (2013.01)

(58) Field of Classification Search
USPC ...................................... 703/23, 24
See application file for complete search history.

(56) References Cited

U.S. PATENT DOCUMENTS 6,661,203 B2 * 12/2003 Wolin et al. .................. 320/134

OTHER PUBLICATIONS

Sami Vaarala, "Security Considerations of Commodity x86 Virtualization", May 22, 2006.*
Hypervisor, Wikipedia, http://en.wikipedia.org/wiki/Hypervisor, pp. 1-5, Jan. 15, 2008.
Stephen Greenberg, Best Practice recommendations for the use of Hardware and Operating System Virtualization in the creation of new Virtualization Solutions; http://64.233.169.104/search?q=cache:VvbbjZWC8T8J:www.thinclient.net/White_Papers/Best_Practises_for_Hardware_and_Software_Virtualizationv1.0.pdf+greenberg+best+practice+virtualization&hl=en&ct=clnk&cd=1&gl=us.
Stephen J. Bigelow, Storage virtualization soothes utilization, management pains; http://searchdatacenter.techtarget.com/news/article/0,289142,sid80_gci1201910,00.html; pp. 1-3, Oct. 29, 2007.
Joanna Rutkowska, Virtualization—the other side of the coin, Invisible Things Lab, http://invisiblethingslab.com, 2007, 41 pages.
Joanna Rutkowska, Subverting Vista™ Kernel for Fun and Profit, Advanced Malware Labs, COSEINC, SyScan 2006, Jul. 21, 2006, Singapore & Aug. 3, 2006, Las Vegas, 53 pages.

* cited by examiner

*Primary Examiner* — Saif Alhija
(74) *Attorney, Agent, or Firm* — Daniel P. Morris; Ryan, Mason & Lewis, LLP

(57) ABSTRACT

At least one anomaly associated with at least one actual hardware element in a computer system having a plurality of hardware elements is addressed. The anomaly is detected, and, responsive to the detection, a virtualization layer is inserted between (i) an operating system of the computer system, and (ii) the plurality of hardware elements. Hardware emulation and/or selective hardware activation/deactivation are performed on the at least one actual hardware element by the virtualization layer. The insertion of the virtualization layer is accomplished in an on-the-fly manner.

24 Claims, 3 Drawing Sheets

HARDWARE EMULATION USING ON-THE-FLY VIRTUALIZATION

FIELD OF THE INVENTION

The present invention relates to the electrical, electronic and computer arts, and, more particularly, to hardware emulation and the like.

BACKGROUND OF THE INVENTION

Hardware maintenance is normally problematic from a logistic and system management perspective. Defective hardware normally will prevent a system from continuing normal operation until the defective parts are replaced or repaired. Finally, hardware management can present a problem for system migration.

In a conventional computer system, the operating system installed on the computer accesses hardware devices directly. The piece of software inside an operating system that communicates with the hardware is known as a device driver. In a virtualized system, the operating system does not access the hardware devices directly; instead it communicates with virtual devices provided by the hypervisor, which in turn communicates with the real hardware. The hypervisor can act as a transparent proxy to the hardware (simply relaying access requests from the operating system), but it can also completely alter the view of the hardware that is presented to the operating system.

SUMMARY OF THE INVENTION

Principles of the present invention provide techniques for hardware emulation using on-the-fly virtualization. In one aspect, an exemplary method (which can be computer implemented) for addressing at least one anomaly associated with at least one actual hardware element in a computer system having a plurality of hardware elements includes the steps of: responsive to detecting the at least one anomaly, inserting a virtualization layer between (i) an operating system of the computer system, and (ii) the plurality of hardware elements; and performing at least one of hardware emulation and hardware deactivation on the at least one actual hardware element, with the virtualization layer. The insertion of the virtualization layer is accomplished in an on-the-fly manner (that is, without rebooting the computer system).

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more of the following technical benefits: simplified hardware management, simplified maintenance, and simplified configuration management, by providing "malleable hardware" through on-the-fly virtualization layer insertion.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
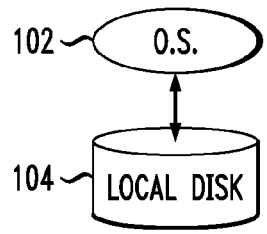
FIG. 1 shows an inventive system during normal operation.

One or more embodiments of the invention provide virtualization mechanisms to enable selective hardware emulation for masking hardware failures, and/or selective activation and deactivation of hardware (which might also be thought of as deactivation and reactivation). In general terms, an inventive method (which can be computer-implemented) for addressing at least one anomaly associated with at least one actual hardware element in a computer system having a plurality of hardware elements includes: responsive to detecting the at least one anomaly, inserting a virtualization layer between (i) an operating system of the computer system, and (ii) the plurality of hardware elements; and performing at least one of hardware emulation and hardware deactivation on the at least one actual hardware element, with the virtualization layer. The insertion of the virtualization layer is accomplished in an on-the-fly manner.

It should be noted that in one or more embodiments, the virtualization layer is not inserted between the operating system and specific hardware elements, but rather under the whole operating system, mediating its access to the entire set of hardware (that is, the plurality of hardware elements). The virtualization layer may, for example, only perform emulation for those devices that fail, allowing transparent access to all other devices.

Non-limiting examples of selective hardware emulation for masking hardware failures include: emulating a failing disk drive using network storage, while still making it appear to the operating system as a local disk; and avoiding stuck-at memory locations by intercepting memory accesses in the virtualization layer. In some instances, inventive hardware emulation for masking hardware failures may be advantageous for key systems in which downtime needs to be substantially reduced.

A non-limiting example of selective activation and deactivation of hardware includes the case of a battery for which a recall has been initiated for safety reasons. Such a battery could be disabled by the virtualization layer, preventing the system from using it until it is replaced. In other instances, some devices could be completely disabled by the hardware for saving power; and/or some devices could be disabled and/or emulated in preparation for system migration to a different platform.

In one or more embodiments, the virtualization layer can be installed on the fly. In the prior art, so-called "HyperJacking" techniques have been used to insert a software layer in a running system, for purposes of intrusion detection, without the need to reboot. Such techniques can be modified by the skilled artisan, given the teachings herein, to permit on-the-fly installation of the virtualization layer; other techniques for installing the virtualization layer may also be employed.

The virtualization layer, according to one or more embodiments of the invention, is a layer of software between the operating system and the hardware, performing one or more inventive activities as described herein. In some instances, the virtualization layer may be a specific piece of software written for a specific purpose, such as that of emulating hardware in case of a failure. In other instances, the on-the-fly emulation (or other) functionality of the virtualization layer is added to a traditional "hypervisor" (a layer between the operating system and the hardware that allows multiple operating systems to run on the hardware (HW) the same time).

One or more embodiments inventively employ the flexibility offered by a virtualization layer to aid in system management tasks. Attention should now be given to FIG. 1, which depicts an inventive system during normal operation. A non-limiting example of selective hardware emulation to mask hardware failures will be provided. In this aspect of the invention, hardware failures are made "invisible" to the operating system 102 by emulating the corresponding hardware in the virtualization layer. When a hardware failure is detected (or upon request), the virtualization layer emulates the hardware as fully functioning, so that the operating system can continue accessing the emulated hardware. Internally, the faulty device can be emulated, for example, using a different device and/or technology. When the device is repaired or replaced, the virtualization layer can return access to it, performing any necessary maintenance tasks (e.g., data migration) so that operation can continue uninterrupted. In this aspect of the invention, the virtualization layer is inserted on the fly.

Figure 2:
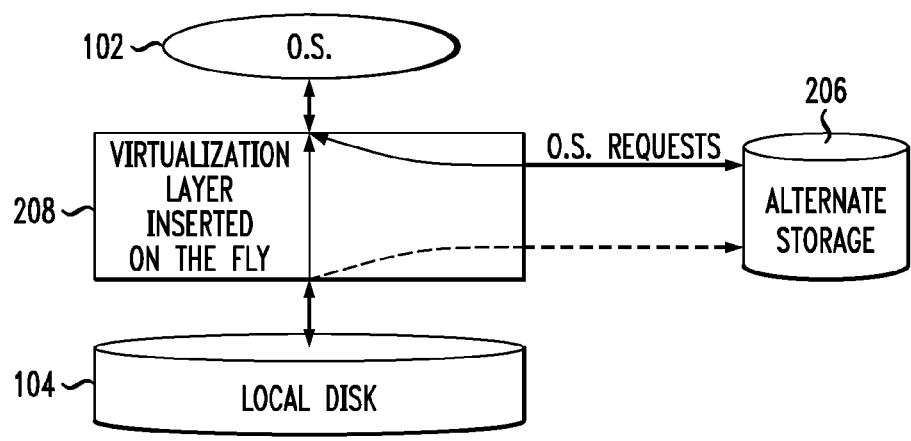
FIG. 2 shows the system of FIG. 1 when early signs of local disk failure have been detected.

Purely by way of example and not limitation, consider one possible embodiment in which a disk failure is masked using available network-based storage. Still with reference to FIG. 1, in normal operation, the operating system 102 accesses the disk 104 directly. Turning now to FIG. 2, when early signs of failure are detected (e.g., using the well-known "SMART" (Self monitoring, analysis and reporting technology) status indicators in the disk 104), a virtualization layer 208 is inserted on the fly, and begins a process that will now be described.

In the process begun by virtualization layer 208, the virtualization layer presents a virtual disk that is identical in its characteristics to the real disk of the machine. The virtualization layer 208 starts to migrate all the data from the real disk 104 to an alternate storage device 206 (e.g., a second disk, or a network storage facility), while keeping a map of the location of each disk sector of disk 104 in the alternate storage 206, so they can be provided to the operating system 102 on request.

The virtualization layer 208 advantageously keeps track of which disk sectors of disk 104 have already been copied to the alternate storage 206. While migration is in progress, disk access requests from the operating system 102 are serviced as follows. Read requests for blocks that have not yet been transferred to the alternate storage 206 are read directly from the original disk 104. Read requests for blocks that have already been transferred to the alternate storage 206 are read from alternate storage 206. Write requests are sent to the alternate storage device 206. The migration from 104 to 206 is indicated by the dotted arrow in FIG. 2. The solid double-headed arrow from 206 to 208 indicates the reads from alternative storage, and the writes.

Figure 3:
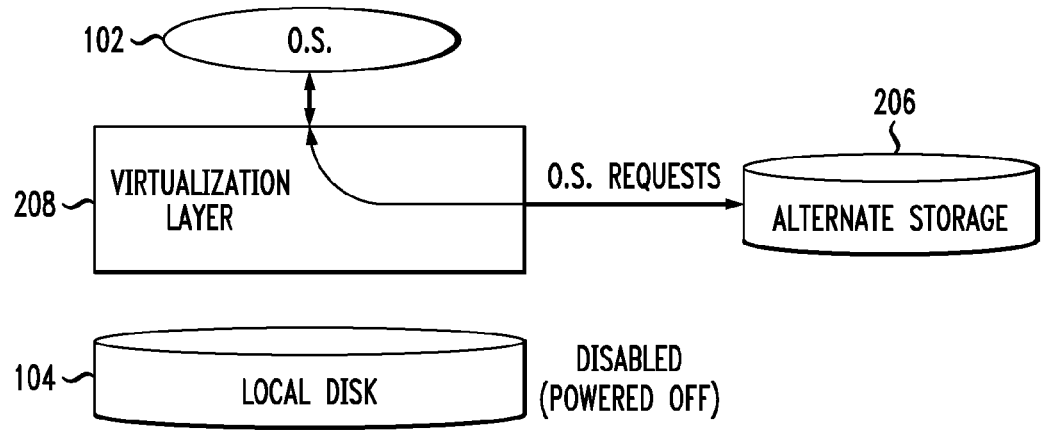
FIG. 3 shows the system of FIG. 1 after migration to alternate storage has been completed.

Giving attention now to FIG. 3, when data migration to alternate storage device 206 is complete, the virtualization layer 208 disables the local disk 104 and continues to emulate it using the alternate storage 206. At this point, the faulty disk 104 can be replaced.

Figure 4:
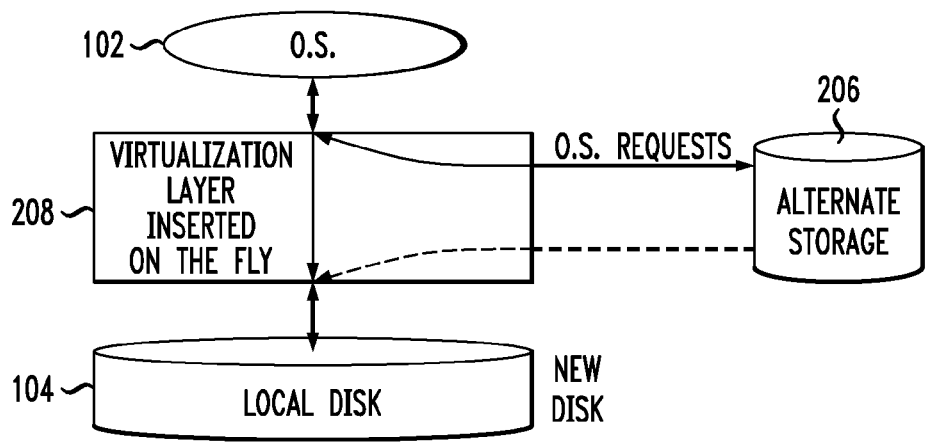
FIG. 4 shows the system of FIG. 1 when the failed local disk has been replaced.

Turning to FIG. 4, after the disk 104 is replaced with new disk 404, a process occurs that is the inverse from the process described in FIG. 2. The virtualization layer 208 migrates data back from alternate storage 206 to the (new) local disk 404, and operating system requests during (reverse) migration are served from either the alternate disk 206 or the local disk 404, according to the state of the migration. After the migration to the local disk 404 finishes, the virtualization layer 208 uninstalls itself to allow the operating system 102 to continue accessing the new disk 404 directly. The dotted line in FIG. 4 represents migration of data from 206 to 404, while the solid double-headed arrow between 206 and 208 indicates operating system requests served from 206.

Given the description of FIGS. 1-4, it will be appreciated that, in general terms, the at least one anomaly associated with the at least one actual hardware element can be a failure of the actual hardware element (a non-limiting example of the actual hardware element is disk 104). The virtualization layer 208 can perform the hardware emulation by presenting to the operating system 102 a virtual hardware element having characteristics substantially similar to those of the actual hardware element. The virtualization layer can be inserted, for example, in response to detecting an anomaly. Failure (anomaly) detection per se can be performed by any known technique and one or more inventive techniques set forth herein simply proceed from the point where the virtualization layer is inserted. In one or more embodiments, the hardware emulation is continued at least until a hardware replacement (a non-limiting example of which is new disk 404) for the at least one actual hardware element is in place.

In an example, the at least one actual hardware element is an original first storage element such as disk 104, and migration is carried out by having the virtualization layer 208 receive requests from operating system 102 to read a block of data from the original first storage element 104. If the block of data has not already been transferred from the original first storage element 104 to second storage element 206, the block of data is read from the original first storage element 104. This process can be repeated for additional blocks of data, and where given blocks of data have already been transferred from the original first storage element 104 to the second storage element 206, the blocks are read from the second storage element 206. When the virtualization layer 208 receives, from the operating system 102, a request to write a particular block of data to the original first storage element 104, the block of data is instead written to the second storage element 206.

The migration can be monitored (for example, by monitoring the writing step), to determine whether migration of substantially all the blocks of data to the second storage element 206 is substantially complete; when such is the case, the original first storage element can be replaced with a replacement first storage element, such as disk 404. The inverse migration process described above can then be carried out. During inverse migration, the virtualization layer 208 may receive from the operating system 102 a request to read a block of data from the replacement first storage element 404. It should be noted that in one or more embodiments, the replacement element may appear to the system the same as the original element 104, such that the request to read from element 404 may be identical to one to read from element 104. If the block of data has not already been transferred from the second storage element 206 to the replacement first storage element 404, the block of data is read from the second storage element 206. The process may be repeated, and when a given block of data is determined to have already been transferred from the second storage element 206 to the replacement first storage element 404, the data is read from the replacement first storage element 404. During reverse migration, the virtualization layer 208 receives from the operating system 102 requests to write a particular block of data to the replacement first storage element 404, and such write operations write the data to the element 404 rather than element 206. Again, the process can be monitored (for example, by monitoring the writing) to determine when substantially all data has been migrated from 206 to 404, after which the virtualization layer 208 can be uninstalled from the system, so that the operating system 102 can access the replacement first storage element 404 directly.

One or more inventive embodiments advantageously apply on-the-fly installation of a virtualization layer for emulating hardware with the purpose of masking failures.

Figure 5:
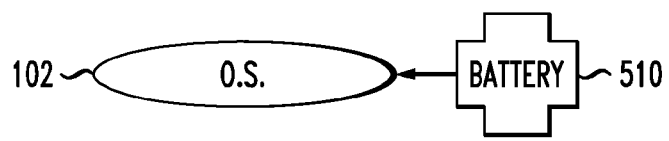
FIG. 5 shows an inventive system having a battery, during normal operation.

Attention should now be given to FIG. 5, for a non-limiting example of selective hardware activation and/or deactivation, according to an aspect of the invention. In some instances, specific devices can be disabled by the virtualization layer to make them invisible to the operating system, and similarly re-enabled (for example, after repair or replacement). In this non-limiting example, this capability is used to disable a battery for which a recall has been initiated by the manufacturer. This action can be triggered, for example, by a software update, which would disable the battery (to avoid possible risks to the user while it has not been replaced) until such time as the battery has been replaced.

Figure 6:
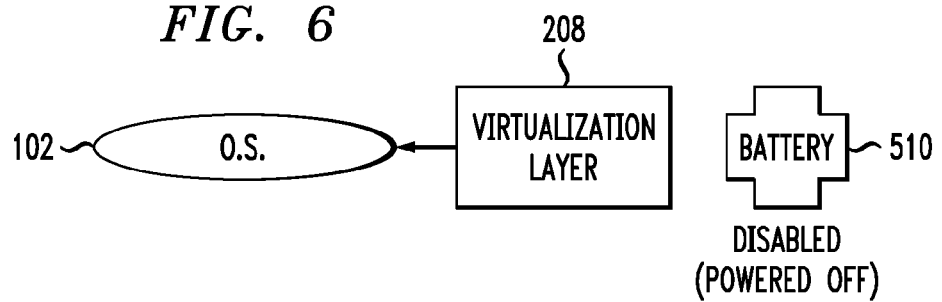
FIG. 6 shows the system of FIG. 5 wherein a dangerous condition has been detected in the battery.

As shown in FIG. 5, during normal operation, the operating system 102 (which can, in general, be the same or different that the operating system in the example of FIGS. 1-4) can read status information about batteries connected to the system, such as battery 510. Turning now to FIG. 6, when a battery, such as battery 510, is deemed dangerous, a virtualization layer 208 (which can, in general, be the same or different from the virtualization layer described with regard to FIGS. 2-4) is inserted on the fly. Virtualization layer 208 reports a "no battery" status to the system and completely disables the physical battery 510. To the operating system 102, it will look as if no battery is present in the system.

The virtualization layer 208 may periodically check the battery 510 to see if it has been replaced. When it detects a replacement, the (replaced) battery is re-enabled and the virtualization layer 208 removes itself so that the system can access the battery again.

Given the example of FIGS. 5 and 6, it will be appreciated that, in general terms, the at least one anomaly associated with the at least one actual hardware element (a non-limiting example of which is battery 510) can, in some instances, be a dangerous condition of the actual hardware element (a non-limiting example of which is a fire hazard or other recall condition associated with a battery). The virtualization layer 208 may perform the hardware deactivation by masking presence of the actual hardware element, such as 510, from the operating system 102, and disabling the actual hardware element, such as 510. In at least some instances, the actual hardware element, such as battery 510, can be monitored for replacement, and responsive to detecting replacement, the masking can be ceased and the virtualization layer 208 can be uninstalled from the system.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 7:
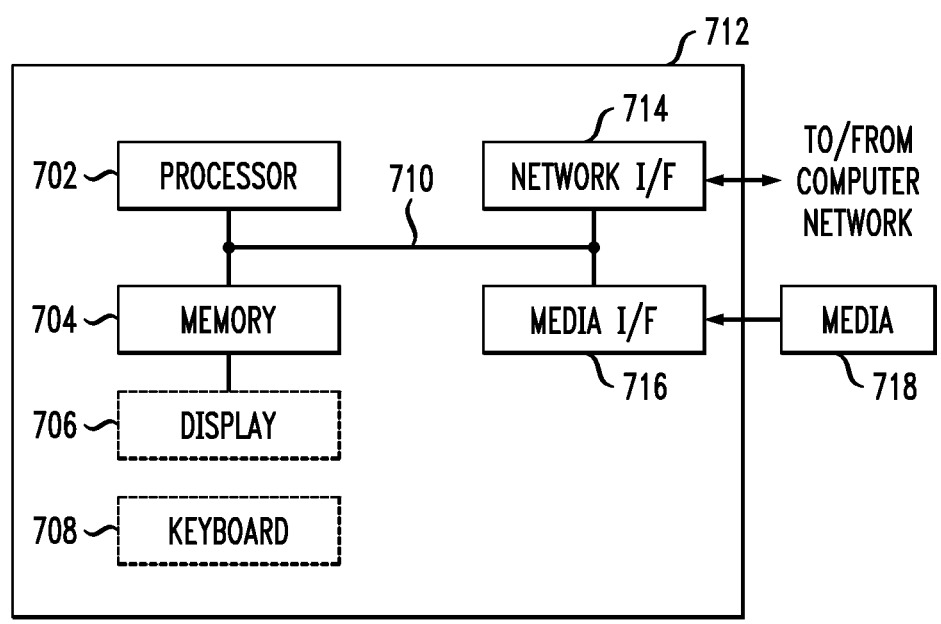
FIG. 7 depicts a computer system that may be useful in implementing one or more aspects and/or elements of the present invention.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 718) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 704), magnetic tape, a removable computer diskette (for example media 718), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for addressing at least one anomaly associated with at least one actual hardware element in a computer system having a plurality of hardware elements, said method comprising the steps of:
   responsive to detecting said at least one anomaly, inserting a virtualization layer between (i) an operating system of said computer system, and (ii) said plurality of hardware elements;
   performing at least one of hardware emulation and hardware deactivation on said at least one actual hardware element, with said virtualization layer;
       wherein said insertion of said virtualization layer is accomplished in an on-the-fly manner;
       wherein said at least one anomaly associated with said at least one actual hardware element comprises a failure of said actual hardware element, and wherein said virtualization layer performs said hardware emulation by presenting to said operating system a virtual hardware element having characteristics substantially similar to those of said actual hardware element; and
       wherein said at least one actual hardware element comprises an original first storage element;
   receiving, by said virtualization layer from said operating system, a request to read a block of data from said original first storage element;
   determining whether said block of data has already been transferred from said original first storage element to a second storage element; and
   responsive to said determining step indicating that said block of data has not already been transferred from said original first storage element to said second storage element, reading said block of data from said original first storage element.

2. The method of claim 1, wherein said failure comprises an incipient failure.

3. The method of claim 1, wherein said hardware emulation is continued at least until a hardware replacement for said at least one actual hardware element is in place.

4. The method of claim 1, further comprising the additional steps of:
   repeating said receiving and determining steps of claim 1 for additional blocks of data; and
   responsive to said repeated determining step indicating that given ones of said additional blocks of data have already been transferred from said original first storage element to said second storage element, reading said given ones of said additional blocks of data from said second storage element.

5. The method of claim 4, further comprising the additional steps of:
   receiving, by said virtualization layer from said operating system, a request to write a particular block of data to said original first storage element; and
   responsive to said write request, writing said particular block of data to said second storage element.

6. The method of claim 5, further comprising the additional steps of:
   monitoring at least said writing to determine whether migration of substantially all said blocks of data to said second storage element is substantially complete; and
   responsive to determining that said migration is substantially complete, replacing said original first storage element with a replacement first storage element.

7. The method of claim 6, further comprising the additional steps of:
   receiving, by said virtualization layer from said operating system, a request to read a block of data from said replacement first storage element;
   determining whether said block of data has already been transferred from said second storage element to said replacement first storage element; and
   responsive to said step of determining whether said block of data has already been transferred from said second storage element to said replacement first storage element indicating that said block of data has not already been transferred from said second storage element to said replacement first storage element, reading said block of data from said second storage element.

8. The method of claim 7, further comprising the additional steps of:
   repeating said receiving step and said determining step of claim 7 for additional blocks of data; and
   responsive to said repetition of said determining step of claim 7 indicating that given ones of said additional blocks of data have already been transferred from said second storage element to said replacement first storage element, reading said given ones of said additional blocks of data from said replacement first storage element.

9. The method of claim 8, further comprising the additional steps of:
receiving, by said virtualization layer from said operating system, a request to write a particular block of data to said replacement first storage element; and
writing said particular block of data to said replacement first storage element.

10. The method of claim 9, further comprising the additional steps of:
monitoring at least said writing to said replacement first storage element to determine whether migration of substantially all said blocks of data to said replacement first storage element is substantially complete; and
responsive to determining that said migration to said replacement first storage element is substantially complete, uninstalling said virtualization layer from said system, so that said operating system can access said replacement first storage element directly.

11. The method of claim 1, wherein said at least one anomaly associated with said at least one actual hardware element comprises a condition of said actual hardware element that indicates that said actual hardware element is to be masked, and wherein said virtualization layer performs said hardware deactivation by:
masking presence of said actual hardware element from said operating system; and
disabling said actual hardware element.

12. The method of claim 11, further comprising the additional steps of:
monitoring said actual hardware element for replacement; and
responsive to detecting replacement, ceasing said masking and uninstalling said virtualization layer from said system.

13. The method of claim 11, wherein said actual hardware element is a battery and wherein said condition comprises a fire hazard.

14. An apparatus for addressing at least one anomaly associated with at least one actual hardware element in a computer system having a plurality of hardware elements, said apparatus comprising:
means for, responsive to detecting said at least one anomaly, inserting a virtualization layer between (i) an operating system of said computer system, and (ii) said plurality of hardware elements;
means for performing at least one of hardware emulation and hardware deactivation on said at least one actual hardware element, with said virtualization layer;
wherein said means for inserting said virtualization layer are configured to accomplish said insertion in an on-the-fly manner;
wherein said at least one anomaly associated with said at least one actual hardware element comprises a failure of said actual hardware element, and wherein said virtualization layer performs said hardware emulation by presenting to said operating system a virtual hardware element having characteristics substantially similar to those of said actual hardware element; and
wherein said at least one actual hardware element comprises an original first storage element;
means for receiving, by said virtualization layer from said operating system, a request to read a block of data from said original first storage element;
means for determining whether said block of data has already been transferred from said original first storage element to a second storage element; and
responsive to said determining indicating that said block of data has not already been transferred from said original first storage element to said second storage element, means for reading said block of data from said original first storage element.

15. The apparatus of claim 14, wherein said failure comprises an incipient failure.

16. The apparatus of claim 14, wherein said means for performing said hardware emulation is configured to continue said emulation at least until a hardware replacement for said at least one actual hardware element is in place.

17. A computer program product comprising a non-transitory computer usable readable recordable storage medium including computer usable program code for addressing at least one anomaly associated with at least one actual hardware element in a computer system having a plurality of hardware elements, said computer program product including:
computer usable program code for, responsive to detecting said at least one anomaly, inserting a virtualization layer between (i) an operating system of said computer system, and (ii) said plurality of hardware elements;
computer usable program code for performing at least one of hardware emulation and hardware deactivation on said at least one actual hardware element, with said virtualization layer;
wherein said computer usable program code for inserting of said virtualization layer is configured to accomplish said insertion in an on-the-fly manner;
wherein said at least one anomaly associated with said at least one actual hardware element comprises a failure of said actual hardware element, and wherein said virtualization layer performs said hardware emulation by presenting to said operating system a virtual hardware element having characteristics substantially similar to those of said actual hardware element; and
wherein said at least one actual hardware element comprises an original first storage element;
computer usable program code for receiving, by said virtualization layer from said operating system, a request to read a block of data from said original first storage element;
computer usable program code for determining whether said block of data has already been transferred from said original first storage element to a second storage element; and
responsive to said determining indicating that said block of data has not already been transferred from said original first storage element to said second storage element, computer usable program code for reading said block of data from said original first storage element.

18. The computer program product of claim 17, wherein said failure comprises an incipient failure.

19. A system for addressing at least one anomaly associated with at least one actual hardware element in a computer system having a plurality of hardware elements, said system comprising:
a memory; and
at least one processor, coupled to said memory, and operative to responsive to detection of said at least one anomaly, insert a virtualization layer between (i) an operating system of said computer system, and (ii) said plurality of hardware elements;

perform at least one of hardware emulation and hardware deactivation on said at least one actual hardware element, with said virtualization layer;
  wherein said processor is operative to insert said virtualization layer in an on-the-fly manner;
  wherein said at least one anomaly associated with said at least one actual hardware element comprises a failure of said actual hardware element, and wherein said virtualization layer performs said hardware emulation by presenting to said operating system a virtual hardware element having characteristics substantially similar to those of said actual hardware element; and
  wherein said at least one actual hardware element comprises an original first storage element;
receive, by said virtualization layer from said operating system, a request to read a block of data from said original first storage element;
determine whether said block of data has already been transferred from said original first storage element to a second storage element; and
responsive to said determining indicating that said block of data has not already been transferred from said original first storage element to said second storage element, the at least one processor being operative to read said block of data from said original first storage element.

20. The system of claim 19, wherein said failure comprises an incipient failure.

21. The method of claim 1, wherein said inserted virtualization layer interfaces directly to one or more of said plurality of hardware elements.

22. The apparatus of claim 14, wherein said inserted virtualization layer interfaces directly to one or more of said plurality of hardware elements.

23. The computer program product of claim 17, wherein said inserted virtualization layer interfaces directly to one or more of said plurality of hardware elements.

24. The system of claim 19, wherein said inserted virtualization layer interfaces directly to one or more of said plurality of hardware elements.

* * * * *